May 26, 1936.  L. L. CUNNINGHAM  2,041,821
STRAIN RELEASE
Filed April 10, 1931
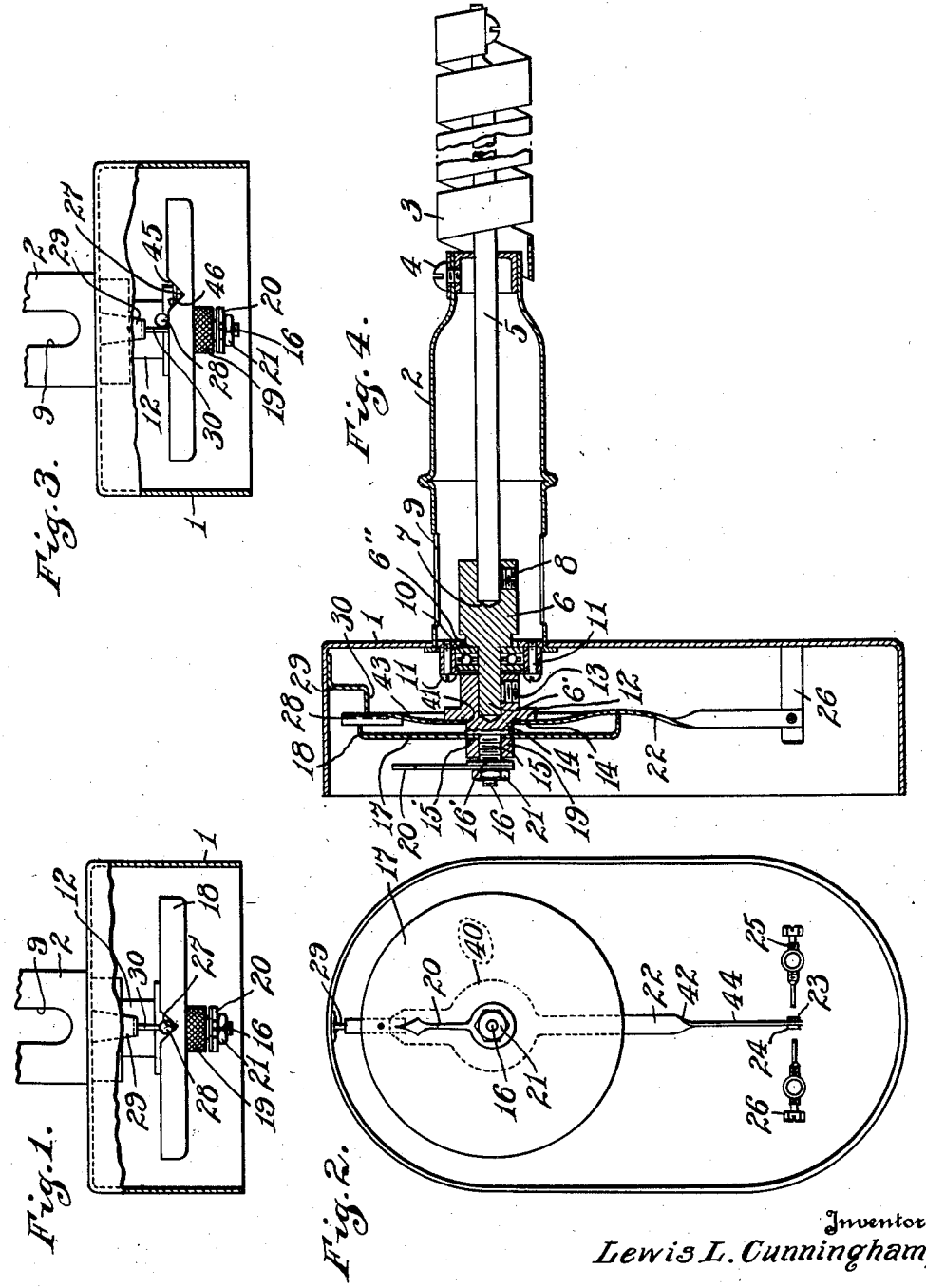
Inventor
Lewis L. Cunningham,
By Hood + Hahn.
Attorneys Patented May 26, 1936

2,041,821

UNITED STATES PATENT OFFICE 2,041,821

STRAIN RELEASE

Lewis L. Cunningham, South Minneapolis, Minn., assignor to Minneapolis-Honeywell Regulator Company, Minneapolis, Minn., a corporation of Delaware Application April 10, 1931, Serial No. 529,132

22 Claims. (Cl. 200—138)

The present application relates to a strain release, and more particularly to means for releasing the connection between two members at times when one of said members tends to move beyond the position corresponding to the limit of movement of the other of said members.

A primary object of the invention is to provide a structure comprising a driving member and a driven member, the degree of movement of the driven member being limited, in which movement of the driving member past a position corresponding to the limit of movement of the driven member may be effected without undue strain being impressed upon the driven member; and in which, upon return movement of the driving member, corresponding movement of the driven member will be prevented until such time as the driving and driven members have been brought again into their original relative positions.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a top plan view of mechanism constructed in accordance with my invention, parts being broken away for clarity of illustration;

Fig. 2 is a front elevation thereof;

Fig. 3 is a view similar to Fig. 1, the parts being shown in different operative positions; and Fig. 4 is a central longitudinal section through the device The embodiment of my invention which is herein illustrated is a thermo-responsive circuit controller, comprising a casing 1 to which is secured a tubular housing 2. A thermo-responsive element, such as a helical bi-metallic strip 3, has its one end secured as by a screw 4 to an extremity of the housing 2, and has its opposite end secured to a shaft 5. The shaft 5 has bearing in said extremity of the housing 2, and has its free end secured in a socket 7 in the end of a coupling member 6, through the medium of a set screw 8.

The coupling member 6 is formed at its opposite end with a reduced extension 6' providing a forwardly facing shoulder 6". The housing 2 is preferably formed with a plurality of apertures 9 permitting air circulation through the housing 2, and permitting manipulation of the set screw 8.

A thrust bearing 10 is secured within the casing 1 by screws 11 or other equivalent fastening means, and the shoulder 6" of the coupling member 6 bears against one face of said thrust bearing 10.

A second coupling member 12 is formed in its one end with a socket receiving the reduced extension 6' of the coupling member 6, said extension being secured in the socket by a set screw 13; and the adjacent face of the coupling member 12 bears against the opposed face of the thrust bearing 10.

The coupling member 12 is provided with a reduced extension 14 forming a forwardly facing shoulder 14'; with a further reduced extension 15 forming a second forwardly facing shoulder 15'; and with a still further reduced extension 16 forming a third forwardly facing shoulder 16'.

An arm 22 is formed intermediate its ends with an enlarged portion 40 provided with an aperture 41 adapted to be sleeved over extension 14 of the coupling member 12, and to bear against the shoulder 14'. The arm 22 is preferably formed of relatively resilient metal, and adjacent its lower end, said arm is twisted as at 42, through 90°.

The upper portion 43 of said arm is, of course, resilient in the direction of the axis of the shaft 5, and carries a cylindrical pin 28 at its extremity.

A disc 17 is apertured to be sleeved over the extension 15, and a nut 19 is threaded on said extension to clamp said disc between said nut and the shoulder 15'. The disc 17 is formed with a rearwardly extending annular flange 18 for a purpose later to be explained.

An indicator finger 20 is apertured to slip over the extension 16, and is clamped against the shoulder 16' by a nut 21 threaded on said extension 16.

The lower end 44 of the arm 22 is provided with a pair of contact elements 23 and 24 adapted to cooperate with adjustable contact elements 25 and 26 mounted within the casing 1.

The flange 18 of the disc 17 is formed with a notch 27, said notch being so formed that the bisector of the angle formed at its apex is parallel with the axis of the shaft 5.

The faces 45 and 46 defining said notch are gently cammed for a purpose which will appear hereinafter.

A bracket 29 secured in the casing 1 is formed with a finger 30 extending substantially into the plane defined by the rearward edge of the flange 18.

The contact elements 25 and 26 being suitably connected in circuits to be controlled, the instrument herein illustrated is mounted with the thermo-responsive element 3 in a position to be subjected to temperature conditions to be observed or controlled. The normal position of the parts is that illustrated in Fig. 1 wherein the pin 28 is positioned in the base of the notch 27, and wherein the disc 17 is so positioned that the apex of the notch 27 is aligned with the finger 30. If the temperature impressed upon the element 3 drops, the element 3 tends to coil still further and, since one end of said element is anchored to the housing 2 while the other end thereof is secured to the shaft 5, the shaft 5 is rocked in a clockwise direction as viewed in Fig. 2. Since the disc 17 is firmly coupled to said shaft, the disc 17 is correspondingly oscillated and, since the pin 28 is received in the notch 27, and since there is no resistance to movement of the arm 22, such movement of the disc 17 carries with it the arm 22, thus moving the contact 24 toward the contact 26. If the temperature continues to drop, the contact element 24 finally engages the contact element 26 and, since the contact element 26 is stationary, further movement of the arm 22 in the same direction is thus impeded. If the shaft 5 continues to rotate in a clockwise direction as viewed in Fig. 2, the resistance to movement of the arm 22 causes the cam face 46 of the notch 27 to flex the finger 43 of the arm 22 rearwardly, thus moving the pin 28 out of the notch 27, and into the position illustrated in Fig. 3. If the disc 17 continues to move in a clockwise direction as viewed in Fig. 2, of course the frictional engagement of the finger 28 with the edge of the flange 18 tends to cause further movement of the arm 22 with the shaft 5, but that tendency is easily overcome by the fact that the contact 24 is in contact with the element 26.

If, now, the temperature impressed upon the element 3 begins to rise, movement of the shaft 5 will be reversed, and the disc 17 will turn in a counter clockwise direction as viewed in Fig. 2. In the absence of provision thereagainst, such movement of the disc would carry with it the arm 22, because of the frictional engagement of the pin 28 with the edge of the flange 18. If such movement of the arm 22 were permitted, of course the arm 22 would immediately be carried out of phase with the shaft 5, and the operation of the instrument would be deleteriously affected. In order to prevent such operation, I have provided the finger 30 which, when the pin 28 is outside of the notch 27, is disposed in the path of return movement of said pin, as shown in Fig. 3. As the disc 17 moves in a counter clockwise direction as viewed in Fig. 2, the pin 28 is held against corresponding movement by its engagement with the finger 30, until such time as the notch 27 again comes into registry with the pin 28. At that time, the pin 28 will drop into the notch 27 and, as is clearly shown in Fig. 1, the finger 30 is so proportioned that, so long as the pin 28 is within the notch 27, the finger 30 will not interfere with movement of said pin.

It will be seen that, when the parts are in the positions illustrated in Fig. 3, wherein the pin 28 is in contact with the right-hand edge of the finger 30 and the contact 24 is in contact with the contact element 26, the arm 22 is held against movement in either direction, since the contact element 26 prevents movement thereof in a clockwise direction, while the finger 30 prevents movement thereof in a counter clockwise direction. It will also be seen that a device constructed in accordance with the present invention positively uncouples the arm 22 from the shaft 5 upon movement of the shaft 5 beyond a position corresponding to the limit of movement of the arm 22, and that thereafter there is no increase in strain upon the arm 22 as a result of further movement in the same direction of the shaft 5. It will also be obvious that the contact carrying arm 22 and the shaft 5 are not immediately coupled upon initiation of reverse movement of the shaft 5, but that they are recoupled only after the initial relation between said arm and said shaft has been re-established.

For purposes of adjustment, the thumb nut 19 may be loosened, and the disc 17 may be rotated to the desired position as indicated by the cooperation of the indicating hand 20 with indicating markings which may be applied to the disc 17.

While the invention has been shown as embodied in an electrical device in which contacts are made and broken in response to temperature changes, it is to be understood that the invention lies in the strain release per se and not in its combination with the particular actuating and actuated elements disclosed; but that it might be applied to structure responsive to any desired variable condition, to effect movement of any desired element.

I claim as my invention:

1. In combination, a shaft, an arm loosely mounted on said shaft, means cooperating with said arm to limit movement thereof about the axis of said shaft, and an element rigidly mounted on said shaft, said arm and said element having cooperating cam surfaces normally engaged to provide a driving connection therebetween, and one of said shaft-mounted members being resiliently held normally in such engagement whereby, upon engagement of said arm with said limiting means, such driving connection is released.

2. In combination, a shaft, an arm loosely mounted on said shaft, means cooperating with said arm to limit movement thereof about the axis of said shaft, and means normally coupling said arm to rotate with said shaft, said last-named means being operable, upon engagement of said arm with said limiting means, to release said arm from said shaft, and being further operable, upon return movement of said shaft, to recouple said arm with said shaft in its original relative position.

3. In combination, a shaft, an arm loosely mounted on said shaft, an element fixed on said shaft and formed to engage said arm at a point removed from the axis of said shaft to couple said arm to move with said shaft, means cooperable with said arm to limit movement thereof with said shaft, said element being formed to release said arm upon movement of said shaft beyond a position corresponding to the limit of movement of said arm, and means cooperable with said arm to cause reengagement of said arm and said element upon return of said shaft to such position.

4. In combination, a shaft, an element fixed on said shaft and formed with a cam surface, an arm loose on said shaft and having a portion engageable by said cam surface, means cooperable with said arm for limiting movement thereof about the axis of said shaft, said cam surface cooperating with said arm portion, upon movement of said shaft beyond a position corresponding to the limit of movement of said arm, to shift said arm portion, in a plane including the axis of said shaft, out of cooperative engagement with said cam surface.

5. In combination, a shaft, an element fixed on said shaft and formed with a cam surface, an arm loose on said shaft and having a portion engageable by said cam surface, means cooperable with said arm for limiting movement thereof about the axis of said shaft, said cam surface cooperating with said arm portion, upon movement of said shaft beyond a position corresponding to the limit of movement of said arm, to shift said arm portion, in a plane including the axis of said shaft, out of cooperative engagement with said cam surface, and means cooperating with said arm portion to prevent reverse movement of said arm, after such shifting of said arm portion, until said shaft is returned to said position.

6. In combination, a shaft, an element fixed to said shaft and formed with a notch, the axis of said notch being parallel with the axis of said shaft, an arm loosely mounted on said shaft and having a finger receivable in said notch, said finger being flexible in the direction of the axis of said notch, and stop means for limiting the movement of said arm with said shaft.

7. In combination, a shaft, an element fixed to said shaft and formed with a notch, the axis of said notch being parallel with the axis of said shaft, an arm loosely mounted on said shaft and having a finger receivable in said notch, said finger being flexible in the direction of the axis of said notch, stop means for limiting the movement of said arm with said shaft, and a fixed element aligned, when said shaft is in a neutral position, with the apex of said notch, and engageable with said finger to prevent reverse movement of said arm while said finger is removed from said notch.

8. In combination, an oscillable arm, means cooperable with said arm to limit oscillation thereof in both directions, a shaft, and means normally coupling said arm to said shaft for angular movement therewith, said means being operable to uncouple said arm from said shaft upon continued movement of said shaft after engagement by said arm with said stop means, whereby continued angular shaft movement in the same direction may occur without angular arm movement.

9. In combination, an oscillable arm, a pair of elements cooperable with said arm to limit oscillation thereof in both directions, a shaft, means normally coupling said arm to said shaft for angular movement therewith, said means being operable by angular shaft movement to uncouple said arm from said shaft upon continued movement of said shaft after engagement by said arm with either of said elements, and means cooperable with said arm for preventing return movement thereof while said arm is uncoupled from said shaft.

10. A circuit-controlling instrument comprising a pair of contact elements, each connected in a circuit to be controlled, an arm oscillably mounted to make contact alternatively with said elements, and operating means for said arm, comprising separable coupling elements, and an actuator and means dependent upon actuator movement across either of two positions on opposite sides of a medial position, for alternately separating and reassociating said coupling elements during certain phases only of the movement of said operating means.

11. A circuit-controlling instrument comprising a contact element, an arm, means mounting said arm for oscillation to make and break contact with said element, an operating member, and means for coupling said arm to said member at times only, said last-named means comprising an element carried by said member and provided with a cam surface to engage said arm, whereby movement of said member results in movement of said arm into contact with said contact element and whereby further movement of said member causes said arm to ride out of engagement with said cam surface.

12. A circuit-controlling instrument comprising a contact element, an arm, means mounting said arm for oscillation to make and break contact with said element, an operating member, and means for coupling said arm to said member at times only, said last-named means comprising an element carried by said member and provided with a cam surface to engage said arm, whereby movement of said member results in movement of said arm into contact with said contact element and whereby further movement of said member causes said arm to ride out of engagement with said cam surface, and means for holding said arm against return movement in response to return movement of said member until a predetermined relation between said member and said arm has been established.

13. A circuit-controlling instrument comprising a stationary contact element connected in a circuit to be controlled, an oscillably mounted arm connected in said circuit and movable to make contact with said element, a shaft, and an element fixed on said shaft and formed with a cam surface, said arm having a portion engageable by said cam surface, and said cam surface cooperating with said arm portion, upon movement of said shaft beyond a position corresponding to that at which said arm engages said contact element, to shift said arm portion out of cooperative engagement with said cam surface.

14. A circuit-controlling instrument comprising a stationary contact element connected in a circuit to be controlled, an oscillably mounted arm connected in said circuit and movable to make contact with said element, a shaft, an element fixed on said shaft and formed with a cam surface, said arm having a portion engageable by said cam surface, and said cam surface cooperating with said arm portion, upon movement of said shaft beyond a position corresponding to that at which said arm engages said contact element, to shift said arm portion out of cooperative engagement with said cam surface, and means cooperating with said arm portion to prevent reverse movement of said arm, after such shifting of said arm portion, until said shaft is returned to said position.

15. In combination, a shaft, motive means for rotating said shaft in opposite directions, a pair of elements mounted on said shaft, one only of said elements being directly connected to said shaft, stop means limiting the movement of the other of said elements in both directions, and interengaging means on said elements, said interengaging means being movable out of engagement upon continued movement of said shaft beyond the limit of movement of said second-mentioned element.

16. In combination, a shaft, motive means for rotating said shaft in opposite directions, a pair of elements mounted on said shaft, one only of said elements being directly connected to said shaft, stop means limiting the movement of the other of said elements in both directions, and interengaging means on said elements, said interengaging means being movable out of engagement upon continued movement of said shaft beyond the limit of movement of said second-mentioned element, and other stop means engageable with said second-mentioned element upon such disengagement to hold said element against reverse movement before reengagement of said interengaging means.

17. In combination, a shaft, motive means for rotating said shaft in opposite directions, a pair of elements mounted on said shaft, one only of said elements being directly connected to said shaft, stop means limiting the movement of the other of said elements in both directions, and cam means normally connecting said elements for dependent movement.

18. In combination, a shaft, means for rotating said shaft in opposite directions, an element fast on said shaft, a second element rotatably mounted on said shaft, cam means connecting said elements for dependent movement, and stop means limiting the movement of said last-mentioned element.

19. In combination, a shaft, an element fixed on said shaft and formed with a cam surface, an arm loose on said shaft and having a portion engageable by said cam surface, means cooperable with said arm for limiting movement thereof about the axis of said shaft, said cam surface cooperating with said arm portion, upon movement of said shaft beyond a position corresponding to the limit of movement of said arm, to shift said arm portion out of cooperative engagement with said cam surface.

20. In combination, a shaft, means for rotating said shaft in opposite directions, a pair of elements mounted on said shaft, one only being directly connected to rotate with said shaft, cam means normally operatively connecting the other of said elements to said one element, and means limiting the movement of said second-named element.

21. In combination, two oscillable elements interengageable for concurrent angular movement, means for oscillating the first of said elements, a stop arranged to limit movement of the second of said elements under the influence of said first element, means serving to disengage said two elements angularly upon continued angular movement of the first element subsequent to stoppage of angular movement of the second element, and a second stop arranged to restrain return angular movement of the first element during initial return movement of the second element until rotative angular interengagement of said two elements is reestablished.

22. In combination, two separable elements interengageable for concurrent movement, means for reciprocating the first of said elements, a stop arranged to limit movement of the second of said elements under the influence of said first element, means serving to drivingly disengage the second of said elements from the first of said elements upon continued movement of the first of said elements subsequent to stoppage of movement of the second element, and means arranged to restrain return movement of the first element during initial return movement of the second element until driving interengagement of the said two elements is reestablished.

LEWIS L. CUNNINGHAM.